(12) United States Patent
Lee

(10) Patent No.: US 6,577,772 B1
(45) Date of Patent: Jun. 10, 2003

(54) PIPELINED DISCRETE COSINE TRANSFORM APPARATUS

(75) Inventor: Joo Heung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/224,743

(22) Filed: Dec. 31, 1998

(30) Foreign Application Priority Data

Dec. 23, 1998 (KR) .............................. 98-57797

(51) Int. Cl.[7] .............................. G06K 9/36; G06K 9/46
(52) U.S. Cl. ...................... 382/250; 382/251; 708/402
(58) Field of Search .............................. 382/250, 251, 382/253, 232; 375/240.04; 348/403.1; 708/402, 403, 404, 405, 406, 400

(56) References Cited

U.S. PATENT DOCUMENTS

| | | | |
|---|---|---|---|
| 4,791,598 A | * | 12/1988 | Liou et al. |
| 5,241,395 A | * | 8/1993 | Chen ..................... 358/426.14 |
| 5,333,012 A | * | 7/1994 | Singhal et al. ......... 375/240.04 |
| 5,734,755 A | * | 3/1998 | Ramchandran et al. 358/426.11 |
| 5,739,863 A | * | 4/1998 | Ohtsuki ................. 375/240.04 |
| 5,892,847 A | * | 4/1999 | Johnson ..................... 382/232 |
| 5,894,430 A | * | 4/1999 | Ohara |
| 5,933,194 A | * | 8/1999 | Kim et al. .................. 348/403 |
| 6,105,114 A | * | 8/2000 | Okkuno ..................... 711/155 |
| 6,141,455 A | * | 10/2000 | Matsuzawa ................ 382/250 |
| 6,333,949 B1 | * | 12/2001 | Nakagawa et al. .... 375/240.16 |

* cited by examiner

Primary Examiner—Timothy M. Johnson
Assistant Examiner—Ali Bayat
(74) Attorney, Agent, or Firm—McKenna Long & Aldridge LLP

(57) ABSTRACT

The present invention relates to a DCT operator for compressing image data through dividing the image data into various frequency components by using a spatial correlation on a screen, particularly to be fit with a low-power required mobile video terminal.

Therefore, the present invention provides a DCT operator, in which a range of DCT coefficients for a calculation is controllable among an entire DCT region, and also provides, in another embodiment, a 2D DCT device including a first 1D DCT operator for executing a 1D DCT operation in rows about input image data; a transposition memory for temporarily storing a result of the 1D DCT operator; a second 1D DCT operator for executing a 1D DCT operation in columns about the resultant data processed by the 1D DCT operation in rows and stored in the transposition memory; and a timing control logic unit for controlling operation of the first and second 1D DCT operators and the transposition memory according to a DCT block size control signal given from outside.

27 Claims, 10 Drawing Sheets

PIPELINED DISCRETE COSINE TRANSFORM APPARATUS

BACKGROUND OF THE INVENTION

1. Technical Field

The present invention relates to a technique for realizing a discrete cosine transform (DCT) algorithm which compresses image data through dividing the image data into various frequency components by using a spatial correlation on a screen, and particularly to a low-power pipelined DCT apparatus which is fit with a low-power required mobile video terminal.

2. Description of the Prior Art

The conventional image compressing devices employ a DCT operator, which is widely used in the International Standard such as JPEG, MPEG, H.263 and so on, for processing an orthogonal transform on the given image. The conventional image compressing devices employing the DCT operator dissolve the image data into various frequency image components in the range from a DC value to a high frequency. The conventional image compressing devices then execute a quantization and a variable length coding for compressing the image data.

FIG. 1 shows the above conventional image compressing device. As shown in the figure, the device includes a DCT operator 13 for calculating DCT coefficients from an input image data and a quantizer 14 for quantizing the DCT coefficients. The device also includes an inverse quantizer 15, an inverse DCT operator 16, an adder 17, a plurality of switching logic units 12, 19, and a subtracter 11, all of which form a feedback line for the quantized DCT coefficients. The device additionally includes an image memory 18 for extracting a motion vector V. In addition, the device further includes a coding controller 10 for controlling the quantizer 14 and the switching logic units 12, 19.

In the figure, in the fact that the DCT operator 13 can process an image input data of N×N size, there exist various fast algorithms such as a butterfly structure based on a multiplier.

However, when realizing a DCT operator having the butterfly structure based on a multiplier with an integrated circuit (IC), there are disadvantages in speed and area, because it should carry a complex routing process and many multipliers, caused by an irregular algorithm structure.

In addition, there is a conventional method such as a distributed arithmetic operation for executing the DCT operation by substituting the multipliers with read only memories (ROM) and adders.

The conventional DCT operators, such as the butterfly structure DCT operator and the distributed arithmetic DCT operator as described above, have structures of calculating coefficients in all DCT regions regardless of characteristics of the input image data.

Now, a DCT process in the conventional image compressing device is explained. According to the DCT process, $N^4$ multiplications are operated between DCT kernels, obtained from a cosine function, and input N×N image data for acquiring N×N coefficients in the frequency domain as expressed in the equation $$z(k, l) = \frac{2}{N} \alpha(k)\alpha(l) \sum_{m=0}^{N-1} \sum_{m=0}^{N-1} x(m, n) \times \cos\frac{(2m+1)\pi k}{2N} \cos\frac{(2n+1)\pi l}{2N} \quad \text{Equation 1}$$

where x(m, n) is the input image data, z(k,l) is the DCT coefficient, and $$\alpha(0) = \sqrt{\frac{1}{2}}, \quad \alpha(k) = 1 \ (k \neq 0, 0 \leq m, n, k, i < N)$$

However, when employing row-column decomposition in FIG. 2 by using characteristics of the DCT kernel, the number of the multiplication operations can be decreased to $2N^3$.

In such row-column decomposition, after the input N×N image data passes through a one-dimensional DCT (1D DCT) operator 13-1 in rows, the result thereof is temporarily stored in a transposition memory 13-2. Then, after reading the result in columns, a two-dimensional DCT (2D DCT) operation is executed through a 1D DCT operator 13-3. Because the 1D DCT operator also employs various fast algorithms so that it enhances overall performance, the number of multipliers used in the whole DCT operation should be decreased.

In addition, because the multiplier can be substituted by the ROM and the adder in the distributed arithmetic operation, which allows easier inner product operation of a vector, that may be applied to the DCT operation.

However, though there are many standards in the International Standard for a digital image data compression now, which an inverse discrete cosine transform (IDCT) should meet in a receiving unit for recovering the image, no standard for DCT is specially referred to.

In the image data compressing process, energy is, however, mainly focused on low-frequency data among the data processed by the DCT operation. Then after the quantizing process, there remain only a few lower-frequency coefficients near DCT coefficients about a DC value to be coded, and remaining most higher-frequency coefficients are to be 0 and thrown out.

Therefore, in radio-oriented applications, such as the mobile video terminal, in the facts that a channel band width is restricted, a compression ratio of the image data is high, and low-power should be consumed, the complex calculation for all high-frequency components is not required in the DCT operation.

SUMMARY OF THE INVENTION

Therefore, the present invention is designed to solve the above problems, so object of the invention is to provide a pipelined DCT apparatus for having low complexity in a hardware configuration and consuming low power, so to be more suitable to a mobile video terminal.

In order to accomplish the above object, the present invention provides a DCT operating unit, in which a range of DCT coefficients for a calculation is controllable among an entire DCT region. The range of DCT coefficients for the calculation can be determined by an external control signal. The range of DCT coefficients for the calculation can be also determined by characteristics of input image data. The characteristics of the input image data might be estimated from statistical characteristics of previously calculated DCT coefficients.

In another embodiment, the present invention provides a 2D DCT device including a first 1D DCT operator for executing a 1D DCT operation in rows about input image data; a transposition memory for temporarily storing a result of the first 1D DCT operator; a second 1D DCT operator for executing a 1D DCT operation in columns about the resultant data processed by the 1D DCT operation in rows and stored in the transposition memory; and a timing control logic unit for controlling operation of the first and second 1D DCT operators and the transposition memory according to a DCT block size control signal given from outside.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DETAILED DESCRIPTION OF THE PREFERRED EMBODIMENT

Hereinafter, low-power pipelined DCT apparatuses according to each embodiment of the present invention are explained with reference to the accompanying drawings.

Figure 1:
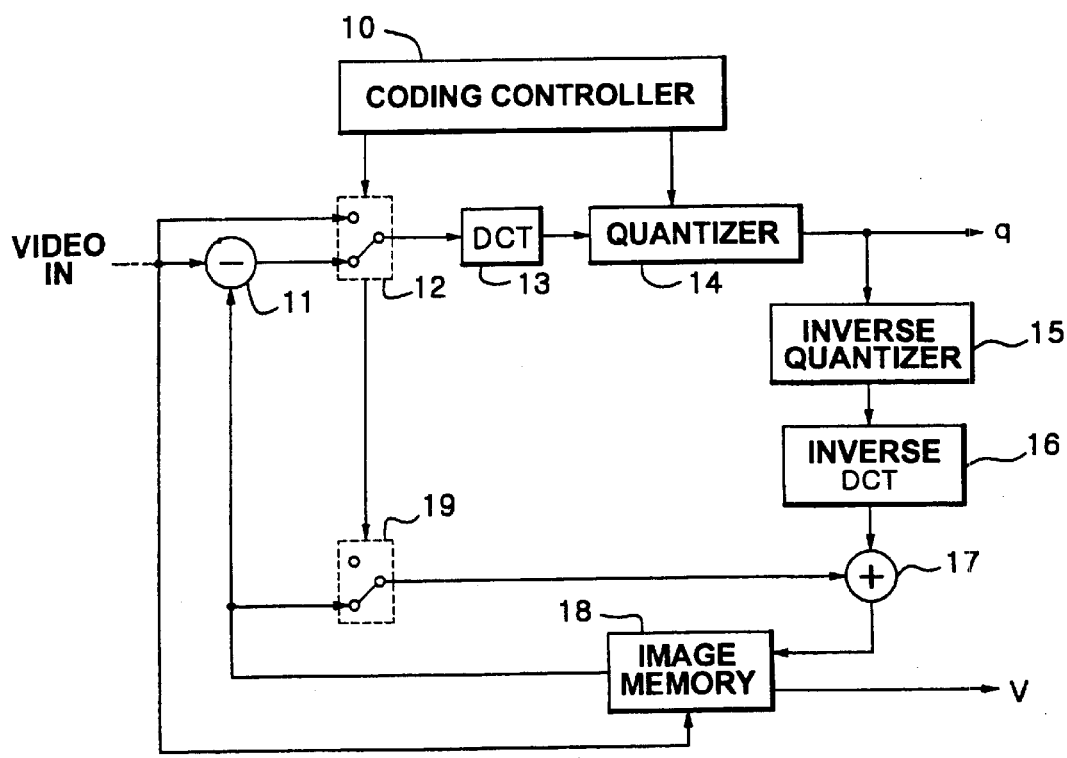
FIG. 1 is a block diagram showing a configuration of a conventional image compressing device.
Figure 2:
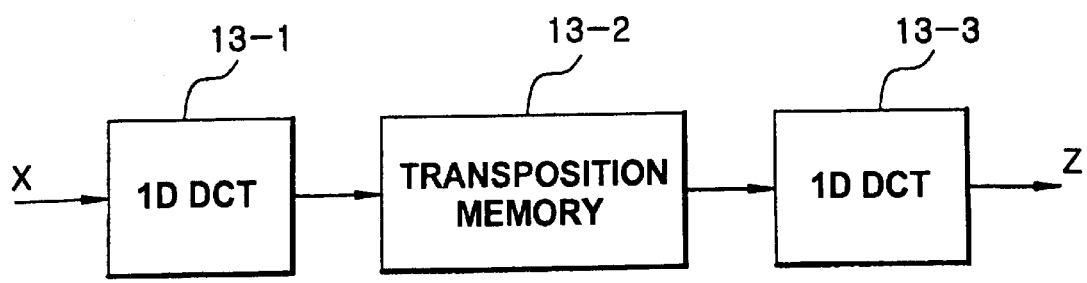
FIG. 2 is a block diagram showing a configuration of a DCT operator employing a conventional row-column decomposition method.
Figure 3:
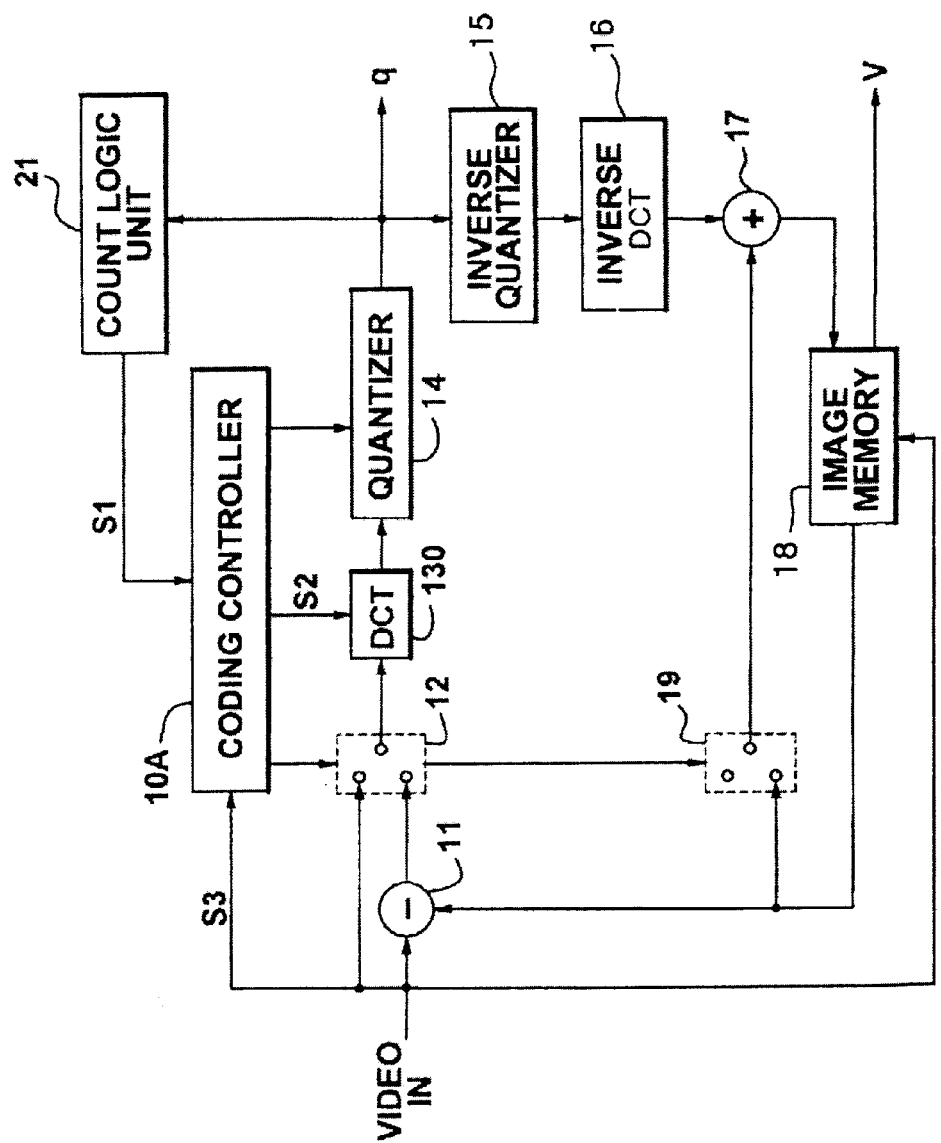
FIG. 3 is a block diagram showing a configuration of an image compressing apparatus to which the present invention is applied.

FIG. 3 is a block diagram for showing a configuration of an image compressing apparatus to which the present invention is applied.

As shown in the figure, the image compressing apparatus, to which the present invention is applied, includes a DCT operating unit 130 for calculating DCT coefficients from an input image data according to a block size control signal, transmitted from outside. And the image compressing apparatus includes a quantizer 14 for quantizing the DCT coefficients. The image compressing apparatus also includes an inverse quantizer 15, an inverse DCT operator 16, an adder 17, a plurality of switching logic units 12, 19, and a subtracter 11, all of which form a feedback line for the quantized DCT coefficients. The apparatus additionally includes an image memory 18 for extracting a motion vector V, The image compressing apparatus further includes a coding controller 10A for controlling a block size of the DCT operating unit 130, the quantizer 14, and a switching logic units 12, 19. The image compressing apparatus also includes a count logic unit 21 for counting the number of DCT coefficients which are not 0, and providing the counting result to the coding controller 10A.

Figure 4A:
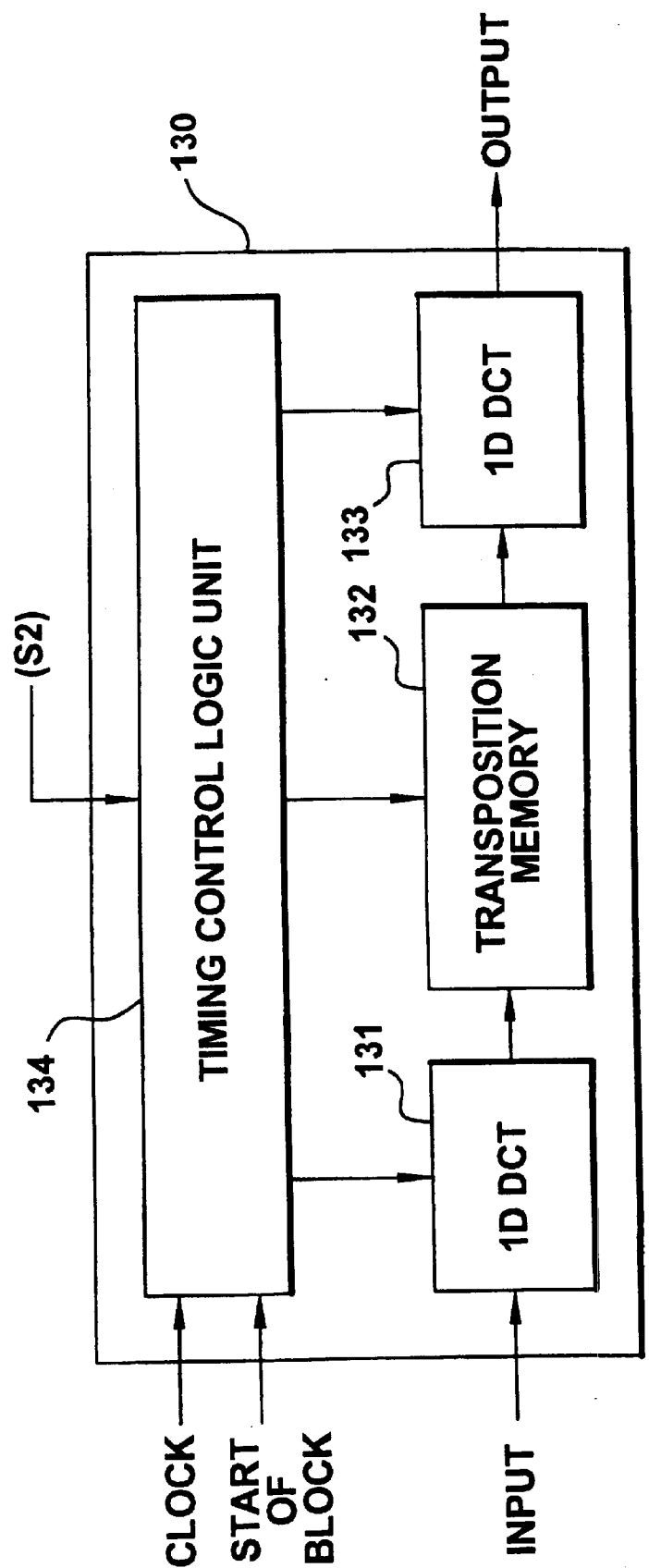
FIG. 4A is a block diagram for illustrating an embodiment of a DCT operating unit in FIG. 3.
Figure 4B:
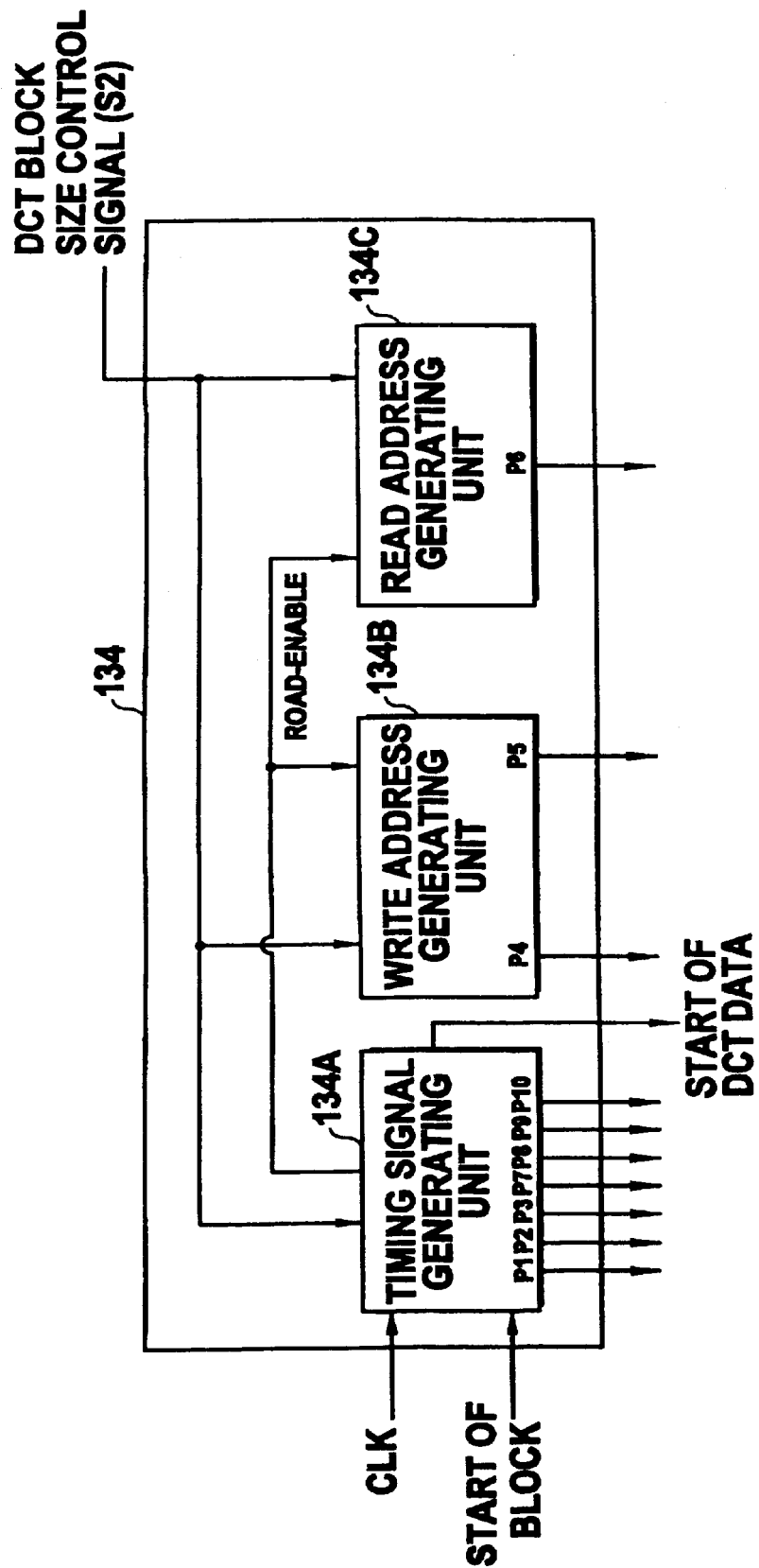
FIG. 4B shows a detailed circuit of a timing control logic unit in FIG. 4A.

FIG. 4A is a block diagram for illustrating an embodiment of the DCT operating unit in FIG. 3, and FIG. 4B shows a detailed circuit of the timing control logic unit in FIG. 4A. Both figures show a configuration of a 2D DCT operating unit including a transposition memory and 1D DCT operators, which are constructed on the basis of a row-column decomposition.

As shown in the FIG. 4A, the DCT operating unit 130 includes two 1D DCT operators 131, 133 and one transposition memory 132. The DCT operating unit 130 further includes a timing control logic unit 134 for adaptively controlling the 1D DCT operators 131, 133 and the transposition memory 132 according to the DCT block size control signal S2, supplied from outside. At this time, the timing control logic unit 134, as shown in FIG. 4B, can include a timing signal generating unit 134A, a write address generating unit 134B, and a read address generating unit 134C.

Figure 5:
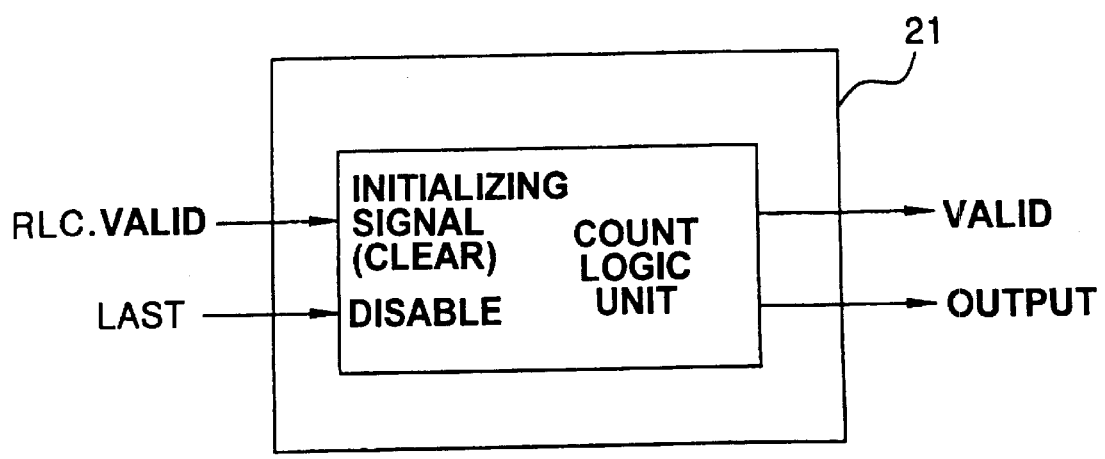
FIG. 5 shows an embodiment of a count logic unit in FIG. 3.

FIG. 5 shows an embodiment of the count logic unit 21 in FIG. 3. Referring to the figure, the count logic unit 21 counts the number of non-zero DCT coefficients by using quantized DCT coefficient information, given by a result (Last: a bit indicating if it is a non-zero final value or not, Run: a number of successive zero values, Level: a quantized level value) from a run-length coding (RLC) in the quantizer. Then the count logic unit 21 outputs the counting result for informing the number of non-zero quantized DCT coefficients to the coding controller. In the figure, a RLC.valid is a control signal for indicating a start of a RLC value transmission. The RLC.valid resets the counter such that the counter starts to count from zero.

Figure 6A:
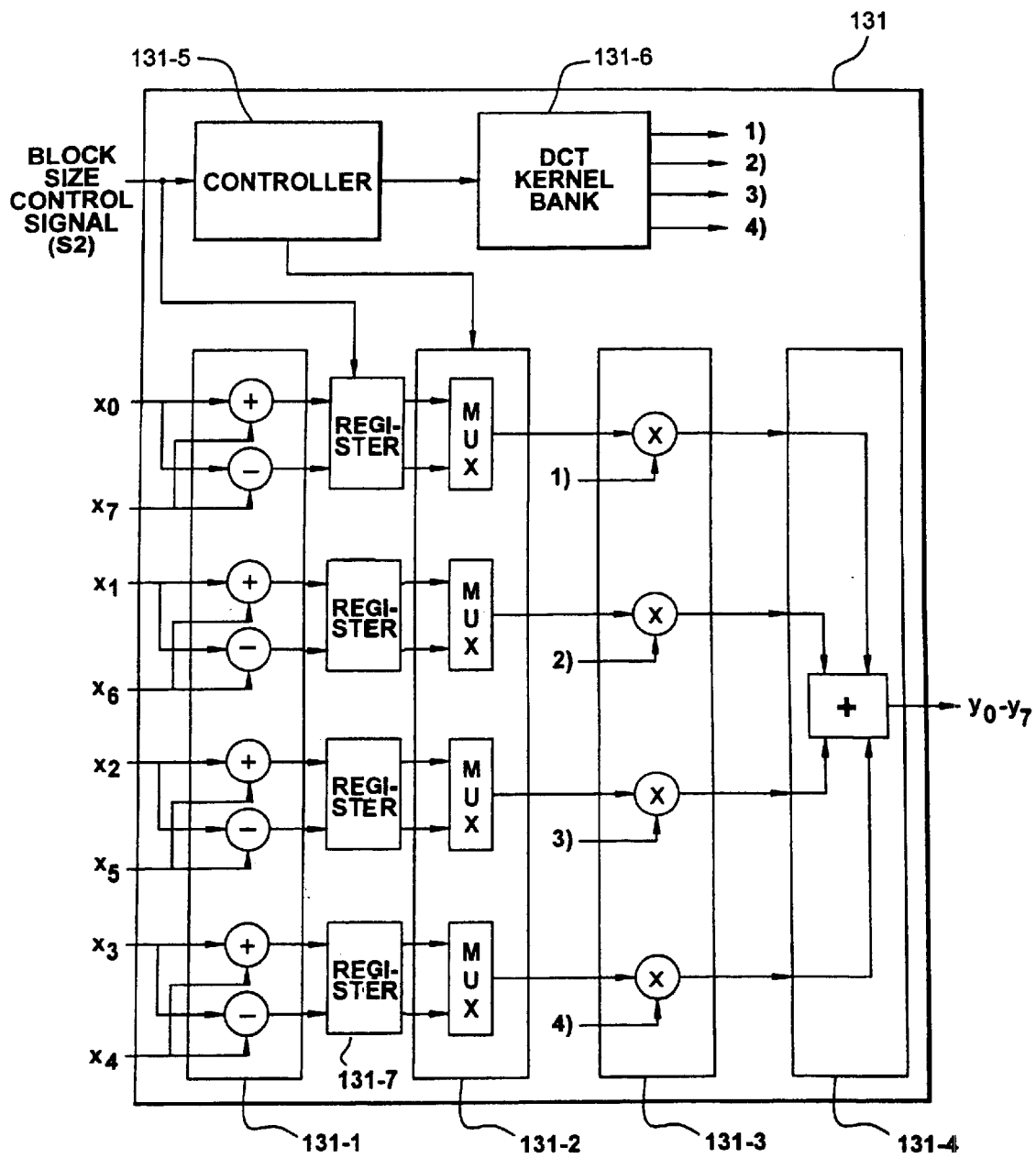
FIG. 6A shows an embodiment for illustrating an inner configuration of the 1D DCT operator in FIG. 4A.
Figure 6B:
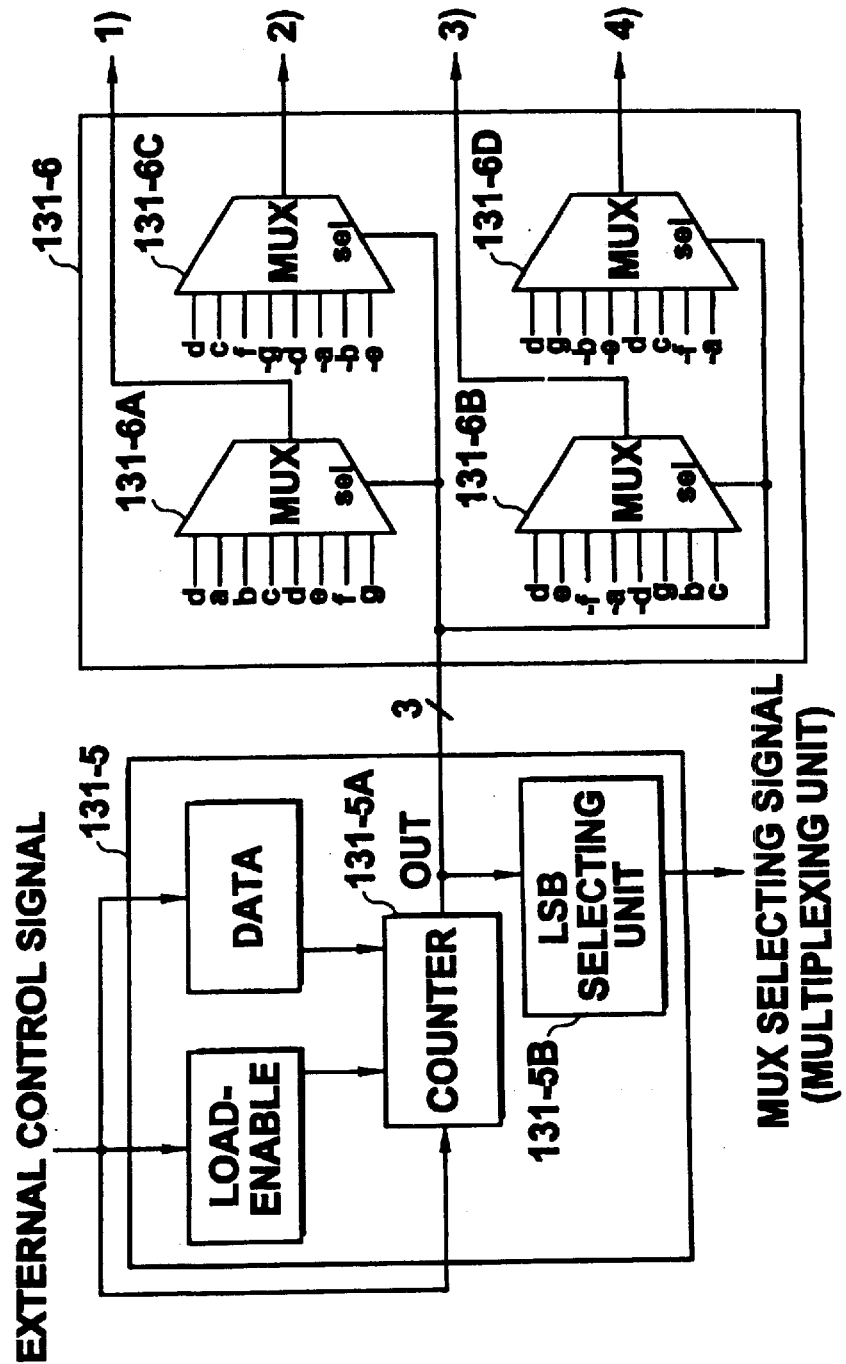
FIG. 6B is a block diagram showing an inner circuit of the control unit and a DCT kernel bank in FIG. 6A.

FIG. 6A shows an embodiment of an inner configuration of the 1D DCT operator in FIG. 4A, and FIG. 6B exemplary shows a detailed circuit of the controller and the DCT kernel bank in FIG. 6A.

As shown in the figures, the 1D DCT operator includes a controller 131-5 for controlling the DCT kernel bank to select a suitable value according to a control signal, transmitted from outside. The controller 131-5 also controls a select signal of a multiplexer and an operating range of the DCT coefficients (how much order of the coefficients should be operated). The 1D DCT operator further includes a DCT kernel bank 131-6 for outputting a corresponding kernel value according to the controller 131-5. The DCT kernel bank 131-6 consists of values selected from the DCT kernel.

The controller 131-5 includes a counter 131-5A for counting the number of the block by using a load-enable signal and data in the DCT block size control signal (a signal transmitted from the timing control logic unit 134). The controller 131-5a also includes a LSB selecting unit 131-5B for obtaining a least significant bit LSB from the output of the counter 131-5A, and transmitting the LSB as a multiplexer select signal of the multiplexing unit.

In addition, the DCT kernel bank 131-6 can also consist of a plurality of multiplexers 131-6A to 131-6D, which have different inputs respectively.

In addition, the 1D DCT operator 131 includes a first operator 131-1, a plurality of registers 131-7, a multiplexing unit 131-2, a second operator 131-3, and a third operator 13-14. The first operator 131-1 includes a plurality of adders and subtracters therein. And, the first operator 131-1 adds and subtracts the input image data in a suitable order for obtaining results ($x_0 \pm x_7$, $x_1 \pm x_6$, $x_2 \pm x_5$, and $x_3 \pm x_4$) according to symmetry of a cosine function. The registers 131-7 store values calculated in the first operator 131-1. The multiplexing unit 131-2 has a plurality of multiplexers therein. The multiplexing unit 131-2 appropriately selects one among added data and subtracted data, calculated in the first operator 131-1 and stored in the registers 131-7 according to a select signal supplied from the controller 131-5. The second operator 131-3 includes a plurality of multipliers therein. The second operator 131-3 carries out a multiplying operation of the added or subtracted data selected from the multiplexing unit 131-2 and the DCT kernel value given from the DCT kernel bank. The third operator 13-14 having an adder adds the resultant values of the second operator 131-3 and stores a result on the registers.

Figure 7A:
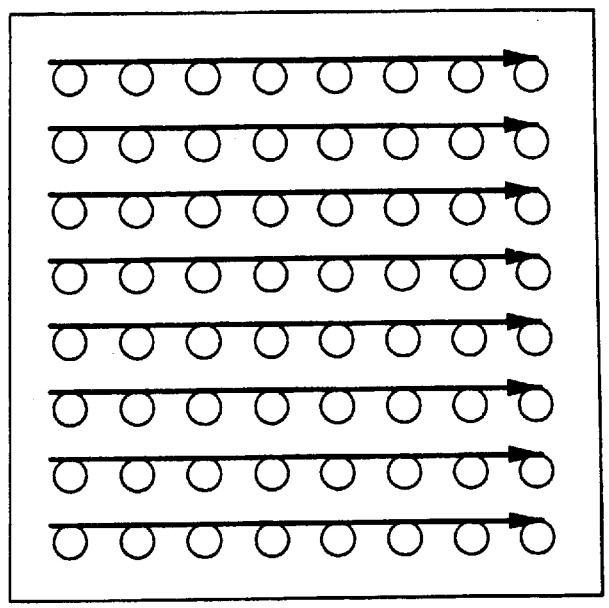
FIGS. 7A, 7B and 7C show a transforming process of input image data having 8×8 size into a smaller block of DCT coefficients mainly focused on lower frequencies.
Figure 7B:
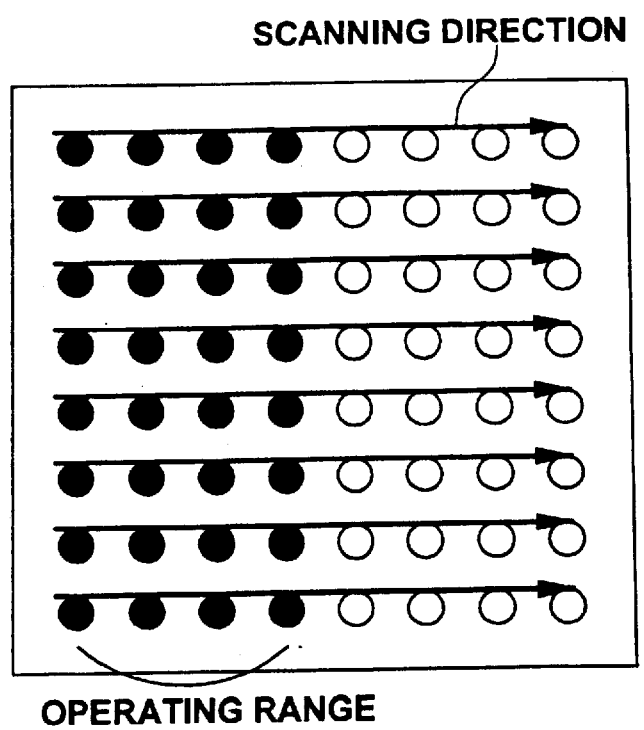
Figure 7C:
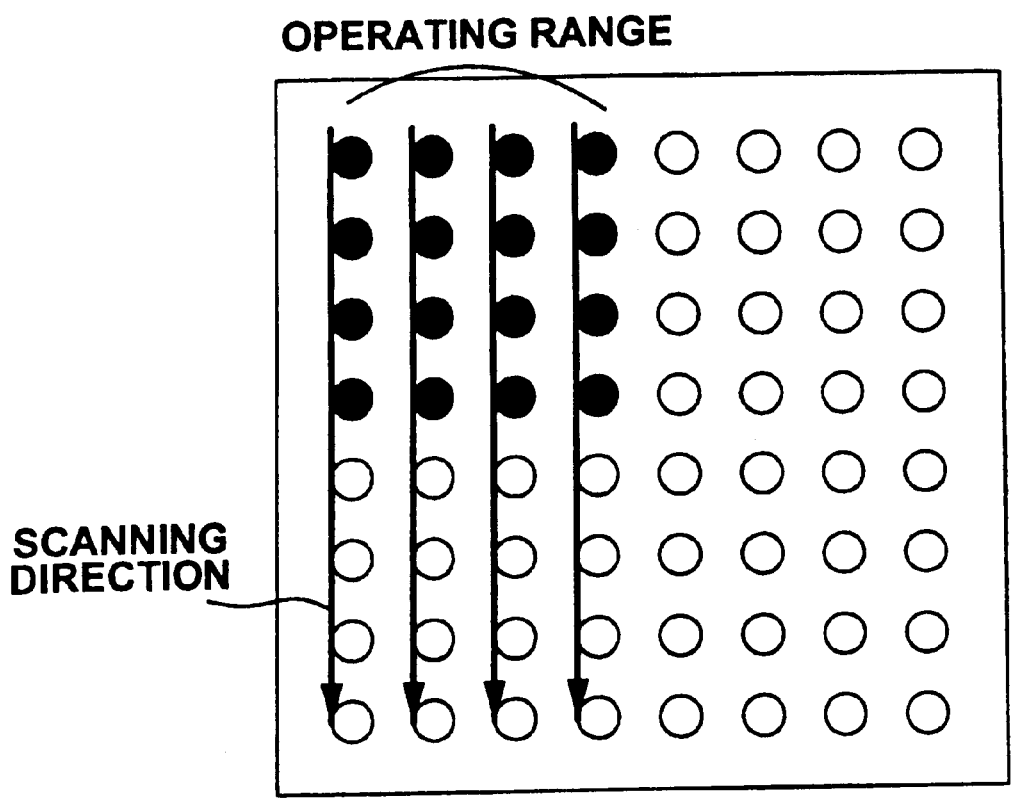

FIGS. 7A to 7C is for explaining an operating process of input image data implemented by row-column decomposition. FIG. 7A illustrates an input image data having an 8×8 size. FIG. 7B illustrates a first DCT operation according to a row direction scanning. FIG. 7C, on the other hand, illustrates a second DCT operation by a column direction scanning. In FIG. 7B, it can be specially seen that all of 4 columns in a left side on the figure are included in a first operating range. And, in a second operating range, only upper 4 rows in the 4 columns in the left side on the figure are included.

Now, operation and effect of the present invention as constructed above will be explained.

As shown in FIG. 3, the DCT apparatus of the present invention counts non-zero DCT coefficients with the count logic unit 21. The counted result S1 is provided to the coding controller 10A. The coding controller 10A controls the block size control signal S2 according to information of the quantized DCT coefficients. The quantized DCT coefficients are outputted from the DCT operating unit 130 and the quantizer 14 in the image compressing apparatus. The DCT operating unit 130 having an inner configuration shown in FIGS. 4 to 6, adaptively calculates the DCT coefficients according to the controlled DCT block size control signal.

The operation of the first operator 131-1 is now described in detail.

At first, characteristics of data processed by the DCT operation and the quantization vary significantly according to the kind of coding of a macro block (MB) such as intra coding or inter coding. In case of intra coding, abundant nonzero coefficients exist. On the contrary, in case of the inter coding, most coefficients have zero value.

Therefore, by using the information S3 of the MB coding or by using statistical information of nonzero DCT coefficients transmitted from the count logic unit, the coding controller 10A determines the DCT operating range. The determined DCT operating range is transmitted to the DCT operating unit 130 by using the DCT block size control signal S2 so as to control an operating range of the DCT operating unit 130.

The statistical information can be the number of non-zero coefficients in an immediately preceding macro block or an average of non-zero coefficients per the macro block during an immediately preceding frame. Besides that, by using the statistical information, the DCT operating range can be determined for an optimal picture quality through a field test in a given channel, in advance.

When a value of the S2 signal is 4, the DCT operator receives 64 (8×8) input image data. Then, the DCT operator calculates only 16 (4×4) DCT coefficients among the 64 (8×8) DCT coefficients, and outputs its results.

In other words, when the value of the DCT block size control signal is "4", the signal is input into the timing signal generating unit 134A, the write address generating unit 134B, and the read address generating unit 134C in the 2D DCT timing control logic unit 134.

By using the signal, the timing signal generating unit 134A transmits signals of output ports P1, P2, P3, P7, P8, P9 to the 1D DCT operators 131, 133 and the transposition memory 132, respectively. Then, the write address generating unit 134B and the read address generating unit 134C generate addresses which are output through P4, P5, and P6.

At this time, P1, P2 and P3 are control signals to be transmitted to the first 1D DCT operator 131. The P1 control signal informs the first 1D DCT operator 131 that a required input image data enters as a block start signal. The P2 control signal is a lock signal to be transmitted to the register 131-7, which stores the result of the first operator 131-1 in the first 1D DCT operator 131. When the P2 control signal is "1", an output value does not change according to any input of the registers 131-7. The P3 control signal is a data signal about the load-enable and the operating range to be transmitted to the first 1D DCT operator 131.

The P4, P5 and P6 signals are transmitted to the transposition memory 132. The P4 is a load-enable signal. The P5 control signal is a write address to be provided to the transposition memory 132. The P6 control signal is a read address to be provided to the transposition memory 132.

The P7, P8 and P9 signals are transmitted to the second 1D DCT operator 133. The P7 signal informs the second 1D DCT operator 133 that the transposition memory 132 reads a required data. The P8 control signal is a lock signal to be transmitted to the register 131-7, storing the result of the first operator 131-1 of the second 1D DCT operator 133. The P9 control signal is a load-enable and a data signal to be transmitted to the second 1D DCT operator 133.

The P10 signal informs the quantizer 14 that the DCT data starts to be transmitted.

The first 1D DCT operator 131 begins its operation with the P1 signal as its starting point. The P2 signal controls timing for storing data in the registers 131-7. The P3 signal enters the controller 131-5.

Then, the input load-enable and the data signal operate the counter 131-5A. The output of the counter 131-5A is then transmitted to the multiplexers 131-6A to 131-6D of the DCT kernel bank 131-6 as a select signal SEL. Then, the multiplexers transmit suitable coefficients of the DCT kernel bank to the multipliers of the second operator 131-3. The same operation can also be realized when the DCT kernel bank is consisted of an addressable memory.

In addition, the LSB of the counter 131-5A selects an added input data or a subtracted input data in the SEL of multiplexers 131-2A to 131-2D of the multiplexing unit 131-2.

The DCT coefficients, calculated as above, are stored in the transposition memory 132 temporarily. After that, the DCT coefficients pass by another operating process in the second 1D DCT 133, in order to obtain final 2D DCT results.

The 2D DCT coefficients Z, obtained by a general DCT operating process, can be expressed in a matrix, as can be seen in the equation 2a.

$$Z = AXA^t, \quad X = A^t Z A \qquad \text{Equation 2a}$$

where X is an input image data, Z is a 2D DCT coefficient, and A is an orthogonal matrix.

$$A(u, v) = \sqrt{\frac{2}{N}} \alpha(u) \cos\frac{(2v+1)\pi u}{2N}, \qquad \text{Equation 2b}$$

-continued $$A = \begin{bmatrix} d & d & d & d & d & d & d & d \\ a & c & e & g & -g & -e & -c & -a \\ b & f & -f & -b & -b & -f & f & b \\ c & -g & -a & -e & e & a & g & -c \\ d & -d & -d & d & d & -d & -d & d \\ e & -a & g & c & -c & -g & a & -e \end{bmatrix}$$

where $$a = 0.5\cos\frac{\pi}{16}, b = 0.5\cos\frac{2\pi}{16}, c = 0.5\cos\frac{3\pi}{16}, d = 0.5\cos\frac{4\pi}{16},$$

$$e = 0.5\cos\frac{5\pi}{16}, f = 0.5\cos\frac{6\pi}{16}, g = 0.5\cos\frac{7\pi}{16}$$

When separating the equation 2a in a 1D, if AX=Y, Y=($y_0, y_1, \ldots, y_7$), Y becomes a 1D DCT coefficient. Then, values of $y_0, y_1, \ldots, y_7$ can be expressed in the equation 3 by using the characteristics of the matrix A.

$$\begin{bmatrix} y_0 \\ y_2 \\ y_4 \\ y_6 \end{bmatrix} = \begin{bmatrix} d & d & d & d \\ b & f & -f & -b \\ d & -d & -d & d \\ f & -b & b & -f \end{bmatrix} \begin{bmatrix} x_0 + x_7 \\ x_1 + x_6 \\ x_2 + x_5 \\ x_3 + x_4 \end{bmatrix}, \quad \text{Equation 3}$$

$$\begin{bmatrix} y_1 \\ y_3 \\ y_5 \\ y_7 \end{bmatrix} = \begin{bmatrix} a & c & e & g \\ c & -g & -a & -e \\ e & -a & g & c \\ g & -e & c & -a \end{bmatrix} \begin{bmatrix} x_0 - x_7 \\ x_1 - x_6 \\ x_2 - x_5 \\ x_3 - x_4 \end{bmatrix}$$

For executing the 1D DCT conversion for the input image data $x_0 \sim x_7$, the input image data $x_0 \sim x_7$ are at first inputted to the adder and the subtracter. Then, the outputs of the adder and subtractor are represented in two 4×1 matrices, located in the right side of the equation 3. By means of executing the adding or subtracting operation about the input data beforehand, the number of the multiplying operations can be reduced in a half.

For obtaining a 2D DCT value, the value Y is transposed as expressed in the equation 2, and then the 1D DCT conversion is executed one more time according to the equation 3.

According to that, the 2D DCT apparatus can have a structure suitable for calculating the low frequency DCT coefficients first, as shown in FIG. 7.

Therefore, the controller 131-5 selects the kernel value, having N/2 elements in the DCT kernel bank, n times according to a external control signal, obtained from the DCT block size control signal S2. Therefore, N units of the DCT coefficients $y_0 \sim y_7$ can be obtained.

As an example, assume that the multiplexing unit 131-2 selects an added result from the first operator 131-1, and the DCT kernel bank 131-6 provides a value "d" to the four multipliers in the second operator 131-3. Then, a first DCT coefficient, $y_0$, can be obtained by the third operator 131-4.

$$Y_0 = (x_0 + x_7)d + (x_1 + x_6)d + (x_2 + x_5)d + (x_3 + x_4)d$$

However, the coding controller 10A in FIG. 3 controls a quantizing scale of the quantizer 14 for adjusting an amount of generated data according to information such as a band width of the channel and an information occupancy of a bit stream output buffer. At this time, the coding controller 10A adjusts the DCT block size control signal suitably by using an information of the quantized DCT coefficients, given from the count logic unit 21, as shown in FIG. 3. As a result, the DCT operating unit 130 can calculate low frequency components mainly. Therefore, there is an advantage that the operating process for the high frequency components, most of which are limited to "0" after the quantization, can be eliminated.

In practice, because the information of the quantized DCT coefficients commonly has a run-length coding result of Last, Run, or Level, the number of non-zero DCT coefficients can be easily calculated by using a simple count logic in FIG. 5 by using the result. The DCT operator has a suitable configuration for applications requiring a high compression ratio and a low-power such as a mobile video terminal.

In the equation 2b which expresses a DCT operation into a matrix equation, when applying symmetry of the cosine function consisting the matrix A, the operating process can be dramatically decreased as shown in the equation 3. In addition, when the second operator 131-3 multiplies values, selected in the multiplexing unit 131-2, by DCT kernel values, suitably selected by the controller 131-5, the DCT coefficients in a frequency region can be obtained in a required order.

Therefore, by omitting the unnecessary operating process for the high frequency coefficients, the present invention can decrease a delayed time created in the DCT operating process. In addition, because an amount of the operation is reduced, a consuming power can be lower.

Furthermore the present invention can be easily configured with a regular structure. Besides that, in the present invention, an accuracy of the DCT operation can be controlled by adjusting the values of the DCT kernel bank. Therefore, the present invention has an advantage of reducing area required for assembling hardware by using the DCT kernel bank having a low accuracy in applications requiring a high compressing ratio.

What is claimed is:

1. A two-dimensional (2D) discrete cosine transform (DCT) device comprising:
   a first one-dimensional (1D) operator for executing a 1D DCT operation in rows for input image data;
   a transposition memory for temporarily storing resultant data of the first 1D DCT operator;
   a second 1D DCT operator for executing a 1D DCT operation in columns for the resultant data of the first 1D DCT operator and stored in the transposition memory;
   a control logic unit for controlling operation of the first and second 1D DCT operators and the transposition memory according to an external DCT block control signal; and
   a coding controller for controlling the external DCT block control signal according to information of quantized DCT coefficients.

2. A 2D DCT device according to claim 1, wherein the first 1D DCT operator comprises:
   a DCT kernel bank controller for controlling an operating range of DCT coefficients according to a control signal from the control logic unit; and
   a DCT kernel bank for storing DCT kernel values,
   wherein the DCT kernel bank controller designates a desired DCT kernel value in the DCT kernel bank, and
   wherein the DCT kernel bank outputs the DCT kernel value designated by the DCT kernel bank controller.

3. A 2D DCT device according to claim 2, wherein the first 1D DCT operator further comprises:

an adding/subtracting unit having a plurality of adders and subtractors therein for respectively adding/subtracting components of the input image data symmetrically with a cosine function to produce added and subtracted data; and a multiplexing unit having a plurality of multiplexers therein for selecting one of the added and subtracted data according to a select signal from the DCT kernel bank controller; and a multiplying unit having a plurality of multipliers therein for multiplying the selected one of the added and subtracted data by the DCT kernel value output from the DCT kernel bank.

4. A 2D DCT device according to claim 2, wherein the second 1D DCT operator comprises:

a DCT kernel bank controller for controlling an operating range of DCT coefficients according to a control signal from the control logic unit; and a DCT kernel bank for storing DCT kernel values, wherein the DCT kernel bank controller designates a desired DCT kernel value in the DCT kernel bank, and wherein the DCT kernel bank outputs the DCT kernel value designated by the DCT kernel bank controller.

5. A 2D DCT device according to claim 1, wherein the control logic unit comprises:

a write address generating unit for providing write control signals to the transposition memory;

a read address generating unit for providing write control signals to the transposition memory; and a timing signal generating unit for providing timing signals to control the first and second 1D DCT operators.

6. A DCT calculator including the 2D DCT device of claim 1, and further comprising:

a counter for counting non-zero quantized DCT coefficients; and a coding controller for generating the DCT block control signal.

7. A DCT calculator, comprising:

input means for receiving input data;

a DCT operator for performing a DCT calculation on the received input data; and a controller for controlling a range of DCT coefficients employed in the DCT calculation, wherein the controller outputs to the DCT operator a number of DCT coefficients which are desired for the DCT calculation and wherein an upper limit of the number of DCT coefficients is set by an external control signal.

8. The DCT calculator of claim 7, wherein the controller controls the range of DCT coefficients in response to an external control signal.

9. The DCT calculator of claim 8, wherein the range of DCT coefficients is determined by characteristics of the input data.

10. The DCT calculator of claim 8, wherein the characteristics of the input data are estimated from a statistical property of previously calculated DCT coefficients.

11. The DCT calculator of claim 10, wherein the statistical property of the previously calculated DCT coefficients is a number of non-zero quantized DCT coefficients in a previous data block.

12. The DCT calculator of claim 10, wherein the statistical property of the previously calculated DCT coefficients is a number of non-zero quantized DCT coefficients in a previous data frame.

13. The DCT calculator of claim 8, wherein the characteristics of the input data is a coding mode for a corresponding macro block of data.

14. The DCT calculator of claim 7, further comprising a DCT kernel bank for storing DCT kernels, wherein the controller provides a control signal to the DCT kernel bank and the DCT kernel bank outputs corresponding DCT kernels according to the control signal.

15. The DCT calculator of claim 14, wherein the DCT kernel bank includes multiplexers for outputting the corresponding DCT kernels according to the control signal from the controller.

16. The DCT calculator of claim 14, wherein when the input data includes N data values input at a same time, then N/2 elements of the DCT kernel are selected at the same time.

17. The DCT calculator of claim 14, further comprising:

an adder/subtractor having for adding/subtracting values of the input data in pairs; and a multiplying unit for multiplying output values of the adder/subtractor by the DCT kernels output from the DCT kernel bank.

18. The DCT calculator of claim 14, wherein when the input data includes N data values input at a same time, then a number of multiplying operations for obtaining one of the DCT coefficients is reduced to N/2 multiplications by adding/subtracting input data in pairs.

19. A discrete cosine transform (DCT) calculator comprising:

input means for receiving input image data;

a two dimensional (2D) DCT device, coupled to the input means, for performing a DCT calculation with respect to the input image data in response to a DCT block control signal;

a quantizer, coupled to the 2D DCT device, for generating DCT coefficients by quantizing resultant data of the DCT calculation in response to a quantizer block control signal;

a counter, coupled to the quantizer, for generating a count signal by counting non-zero DCT coefficients from the DCT coefficients; and a coding controller, coupled between the 2D DCT device and the counter, for generating the DCT block control signal and the quantizer block control signal in response to the count signal.

20. A DCT calculator according to claim 19, wherein the coding controller further generates the DCT block control signal and the quantizer block control signal in response to the input image data.

21. A DCT calculator according to claim 19, wherein the 2D DCT device comprises:

a first one-dimensional (1D) operator for executing a 1D DCT operation in rows for the input image data;

a transportation memory for temporarily storing resultant data of the first 1D DCT operator;

a second 1D DCT operator for executing a 1D DCT operation in columns for the resultant data of the first 1D DCT operator stored in the transportation memory to generate the resultant data of the DCT calculation; and a control logic unit for controlling operation of the first and second 1D DCT operators and the transposition memory in response to the DCT block control signal.

22. A DCT calculator according to claim 21, wherein the first 1D DCT operator further comprises:

a DCT kernel bank controller for controlling an operating range of DCT coefficients according to a control signal from the control logic unit; and a DCT kernel bank for storing DCT kernel values, wherein the DCT kernel bank controller designates a desired DCT kernel value in the DCT kernel bank; and wherein the DCT kernel outputs the DCT kernel value designated by the DCT kernel bank controller.

23. A DCT calculator according to claim 22, wherein the first 1D DCT operator further comprises:

an adding/subtracting unit having a plurality of adders and subtractors therein for respectively adding/subtracting components of the input image symmetrically with a cosine function to produce added and subtracted data;

a multiplexing unit having a plurality of multiplexers therein for selecting one of the added and subtracted data according to a select signal from the DCT kernel bank controller; and a multiplying unit having a plurality of multipliers therein for multiplying the selected one of the added and subtracted data by the DCT kernel value output from the DCT kernel bank.

24. A DCT calculator according to claim 21, wherein the second 1D DCT operator comprises:

a DCT kernel bank controller for controlling an operating range of DCT coefficients according to a control signal from the control logic unit; and a DCT kernel bank for storing DCT kernel values, wherein the DCT kernel bank controller designates a desired DCT kernel value in the DCT kernel bank; and wherein the DCT kernel bank outputs the DCT kernel value designated by the DCT kernel bank controller.

25. A DCT calculator according to claim 21, wherein the control logic unit comprises:

a write address generating unit providing write control signals to the transposition memory;

a read address generating unit for providing read control signals to the transposition memory; and a timing signal generating unit for providing timing signals to control the first and second 1D DCT operators.

26. A two-dimensional (2D) discrete cosine transform (DCT) device comprising:

a coding controller for controlling a block size of a DCT operating unit and sending a DCT block size control signal;

a first one-dimensional (1D) operator for executing a 1D DCT operation in rows for input image data;

a transposition memory for temporarily storing resultant data of the first 1D DCT operator;

a second 1D DCT operator for executing a 1D DCT operation in columns for the resultant data of the first 1D DCT operator and stored in the transposition memory; and a control logic unit for controlling operation of the first and second 1D DCT operators and the transposition memory according to the DCT block control signal;

wherein the coding controller controls the DCT block size control signal according to information of the quantized DCT coefficients.

27. The two-dimensional (2D) discrete cosine transform (DCT) device according to claim 26, wherein the first 1D DCT operator comprises:

a DCT kernel bank controller for controlling an operating range of DCT coefficients according to the DCT block control signal from the control logic unit; and a DCT kernel bank for storing DCT kernel values;

wherein the DCT kernel bank controller designates a desired DCT kernel value in the DCT kernel bank; and wherein the DCT kernel bank outputs the DCT kernel value designated by the DCT kernel bank controller.

* * * * *